United States Patent
Miller (10) Patent No.: US 9,738,420 B2
(45) Date of Patent: Aug. 22, 2017

(54) "GREEN" TEMPERATURE-CONTROLLED MAILER

(76) Inventor: Drayton Granville Miller, Mobile, AL (US)

( * ) Notice: Subject to any disclaimer, the term of this patent is extended or adjusted under 35 U.S.C. 154(b) by 51 days.

(21) Appl. No.: 12/945,403

(22) Filed: Nov. 12, 2010

(65) Prior Publication Data

US 2011/0114513 A1    May 19, 2011

Related U.S. Application Data

(63) Continuation-in-part of application No. PCT/US2009/043972, filed on May 14, 2009, which
(Continued)

(51) Int. Cl.
*B65D 81/26* (2006.01)
*B65D 30/02* (2006.01)
(Continued)

(52) U.S. Cl.
CPC .......... *B65D 27/16* (2013.01); *B65D 65/466* (2013.01); *B65D 81/03* (2013.01); *B65D 81/24* (2013.01);
(Continued)

(58) Field of Classification Search
USPC ................. 383/1; 229/80.5; 220/DIG. 30
See application file for complete search history.

(56) References Cited

U.S. PATENT DOCUMENTS 2,842,179 A * 7/1958 Hoeppner .................... 383/87
3,623,653 A * 11/1971 Work ....................... 229/87.05
(Continued)

FOREIGN PATENT DOCUMENTS

EP    1529539    5/2005
JP    1250196 A    10/1989
(Continued)

OTHER PUBLICATIONS

Final Office Action mailed Aug. 18, 2011 for U.S. Appl. No. 12/120,353, filed May 14, 2008.
(Continued)

*Primary Examiner* — Christopher Demeree
(74) *Attorney, Agent, or Firm* — AdamsIP, LLC; J. Hunter Adams; Stephen Thompson (57) ABSTRACT

A mailer has an outer, longitudinally extending, biodegradable film with lateral edges folded on itself to form a pocket having an opening and sealable by a flap. An assembly is composed of an inner, longitudinally extending, biodegradable film having lateral edges and a longitudinal extending pad composed of textile cuttings and microbial and superabsorbent powders. The inner film extends longitudinally around the pad and is attached to the pad. The assembly is positioned in the pocket with the inner film being sealed to the outer film adjacent the opening to the pocket trapping the pad between the outer and inner films. Sealing tape is mounted on the inner film adjacent to the pocket to seal the pocket closed. The lateral edges of both the outer and inner films, which extend laterally beyond the pad, are heat sealed together. A container has an outer box an inner insulative layer. The insulative layer is made from flocked textiles and is mixable with absorbatives and antimicrobials.

21 Claims, 8 Drawing Sheets

Related U.S. Application Data is a continuation-in-part of application No. 12/120,353, filed on May 14, 2008, now abandoned.

(51) Int. Cl.
| | | |
|---|---|---|
| *B65D 81/38* | (2006.01) | |
| *B65D 27/16* | (2006.01) | |
| *B65D 65/46* | (2006.01) | |
| *B65D 81/03* | (2006.01) | |
| *B65D 81/24* | (2006.01) | |

(52) U.S. Cl.
CPC ..... *B65D 81/3858* (2013.01); *B65D 81/3897* (2013.01); *Y02W 90/13* (2015.05)

(56) References Cited

U.S. PATENT DOCUMENTS

| | | | |
|---|---|---|---|
| 5,783,271 | A | 7/1998 | Nishida et al. |
| 6,341,708 | B1 | 1/2002 | Palley et al. |
| 6,974,406 | B2 | 12/2005 | Antonacci |
| 6,991,124 | B1 | 1/2006 | Palley et al. |
| 7,185,778 | B1 | 3/2007 | Palley et al. |
| 7,238,403 | B2 | 7/2007 | Koslow |
| 7,285,318 | B2 | 10/2007 | Kaku et al. |
| 2002/0137420 | A1 | 9/2002 | Dacey et al. |
| 2002/0164088 | A1 | 11/2002 | Collins |
| 2004/0106532 | A1 | 6/2004 | Yokoi et al. |
| 2005/0092636 | A1 | 5/2005 | Su-Syin |
| 2005/0236415 | A1 | 10/2005 | Ozasa et al. |
| 2007/0027052 | A1 | 2/2007 | Yokoi et al. |
| 2007/0212461 | A1* | 9/2007 | Lillevang et al. ............ 426/320 |
| 2008/0223857 | A1 | 9/2008 | Palley et al. |
| 2009/0283578 | A1 | 11/2009 | Miller |
| 2010/0304312 | A1 | 12/2010 | Yokoi et al. |

FOREIGN PATENT DOCUMENTS

| | | |
|---|---|---|
| JP | 2001501896 T | 2/2001 |
| JP | 2007508132 T | 4/2007 |
| KR | 20040032774 A | 4/2004 |
| KR | 20050041984 | 5/2005 |
| KR | 20050041984 A | 5/2005 |
| WO | 9812496 A1 | 3/1998 |
| WO | 03044112 A1 | 5/2003 |
| WO | 2005033676 A1 | 4/2005 |
| WO | 2009140507 | 11/2009 |

OTHER PUBLICATIONS

Life expectancy of products manufactured with ECM maserbatch pellets, ECM BioFilms, Inc., printed 2012 from ecmbiofilms.com.
Definition of "biodegradable", Merriam Webstar dictionary, 2011.
Definition of "biodegradable", vocabulary.com, 2011.
Definition of "biodegradable", Wordsmyth, 2011.
Definition of "biodegradable", American Heritage Dictionary, 2011.
Mechanism for the Biodegradation of Products Manufactured with ECM MasterBatch Pellets, ECM BioFilms, Inc., printed 2011 from ecmbiofilms.com.
Measuring Biodegradability, The University of Waikato, 2011.
Our Technology for the Biodegradation of Plastic Products, ECM BioFilms, Inc., printed 2012 from ecmbiofilms.com.
Comparison of Products Produced with ECM MasterBath Pellets to Alternative Products, ECM BioFilms, Inc., printed 2012 from ecmbiofilms.com.
Federal Trade Commission, Reporter Resources: The FTC's Green Guides, printed from www.ftc.gov/opa/reporter/greengds.shtm on Jan. 23, 2012.
For U.S. Appl. No. 12/120,353, Response filed with USPTO Nov. 1, 2011, Advisory Action issued by USPTO on Nov. 16, 2011, Reponse filed with USPTO on Jan. 18, 2012.
Response filed Jun. 24, 2011 to Office Action dated Feb. 24, 2011 for U.S. Appl. No. 12/120,353.
International Search report dated Nov. 24, 2009 for PCT/US2009/043972, filed May 14, 2009.
International Preliminary Report dated Nov. 17, 2010 for PCT/US2009/043972, filed May 14, 2009.
Written Opinion dated Nov. 14, 2010 for PCT/US2009/043972, filed May 14, 2009.
Office Action dated Feb. 24, 2011 for U.S. Appl. No. 12/120,353.

* cited by examiner

"GREEN" TEMPERATURE-CONTROLLED MAILER

CROSS REFERENCE TO RELATED APPLICATIONS

This application is a continuation-in-part of International Patent Application No. PCT/US2009/043972, filed May 14, 2009, which in turn claimed priority to U.S. patent application Ser. No. 12/120,353, filed May 14, 2008. The contents of these applications are hereby incorporated by reference herein in their entirety.

TECHNICAL FIELD

The field of the invention is packaging, in particular, thermally insulating packaging and biodegradable packaging.

BACKGROUND ART

The current technology provides paper mailers, lined with plastic bubble-wrap, or more expensive foam, or foam-lined, boxes. These products are used primarily for shipping sensitive or fragile items, but suffer from the fact that they have extremely limited cushioning, no absorption properties, no antimicrobial properties and practically no temperature-control value.

Foam, or foam-lined, boxes are also used for shipping temperature-sensitive products, such as, medical samples, pharmaceuticals, chocolates, etc. These current products, in addition to being dramatically more expensive to purchase, warehouse, and ship (inbound and outbound freight), they are also more labor intensive, less user- and environmentally-friendly, and provide very limited protection during transit.

The most common thermally insulative material used is Styrofoam. Styrofoam is not biodegradable. Shaped containers (i.e. a Styrofoam cooler) are not collapsible. Shaped containers are more expensive to ship than flat boxes because they take more volume. Volume of shipping materials correlates to the cost of shipping of the materials.

Styrofoam containers have no absorptive qualities. Likewise, Styrofoam containers have no antimicrobial qualities. Accordingly, once a container is contaminated, any products subsequently inserted within the container will also become contaminated.

DISCLOSURE OF INVENTION

This application represents the continuing efforts of the Applicant concerning "green" mailers either with or without temperature control for storing and/or shipping temperature-sensitive or perishable goods. Related prior patent applications of Applicant include U.S. Provisional Patent Application No. 61/334,797, filed May 14, 2010; U.S. Provisional Patent Application No. 61/315,432, filed Mar. 19, 2010; U.S. patent application Ser. No. 12/120,353, filed May 14, 2008 (published U.S. Patent Application Publication No. 20090283578); and International Patent Application No. PCT/US2009/043972, filed May 14, 2009 (published International Application Publication No. WO/2009/140507). This application also relates to issued U.S. Pat. Nos. 7,229,677; 7,094,192; and 6,875,486. The entirety of the aforementioned patents and applications are incorporated by reference.

The principal object of the invention is to provide a 100% biodegradable temperature controlled mailer. In addition, the mailer according to the invention is user friendly and gusseted.

The novel mailer of the present invention may be used as a stand-alone shipper, or it may be used as an internal package that maintains a properly cold temperature in a larger, non-refrigerated box. Savings are realized from the utilization of the novel mailer of the present invention in terms of a) initial cost, as opposed to a foam-lined box; b) set-up/fulfillment labor expenses; c) storage space, with attendant costs and; d) inbound and out-bound freight charges.

The foregoing is accomplished by a mailer that is composed of materials that are biodegradable. The outer surface of the novel mailer consists of a biodegradable film or paper that is also waterproof. The inner surface of the novel mailer is a biodegradable film or paper (substrate) that is permeable. Sandwiched between the inner biodegradable film or paper (substrate), and sealed on all sides, is a novel, proprietary, biodegradable, pad made from re-cycled, purified, flocked material (e.g. hollow fibers), to which super absorbent powders (for the absorption of spills), and antimicrobial powders (for the prevention of contamination in case of rupture for such products as blood or vaccines, etc.) have been added during manufacture. The antimicrobials are programmed to expire, after a pre-selected desired length of time, to allow for the eventual, natural, degradation/biodegradability of the novel mailer. The outer surface of the novel pad is encompassed with a waterproof, biodegradable film or paper, sealed on two (or three) sides and is double-sealed, with pressure-sensitive, biodegradable tape, at the top, for safety and to prevent tampering. Phase-change materials (refrigerants/gel packs) used in the novel mailer are also biodegradable, making the entire shipping system safer, dramatically more cost effective, user friendly, environmentally friendly, and socially responsible.

The novel pad serves six vital purposes: 1) insulation; 2) padding/cushioning; 3) absorption; 4) antimicrobial action; 5) biodegradability; and 6) cost efficiency (in terms of initial cost, as opposed to a foam-lined box, set-up/fulfillment labor expenses, storage space, with attendant charges, and in-bound and out-bound freight charges).

The insulative properties of the novel mailer are roughly equivalent to one-half inch of foam, thus, allowing for the savings of second-day shipping as opposed to the cost of overnight priority freight/delivery charges as is required with current mailer technology.

A further object of the invention is to provide an entirely biodegradable, thermally-insulating container. An additional object is to provide a container that is made from as many recycled materials as is possible. An additional object is to provide a container that can be shipped flat to the user and then assembled on site to allow the user to save in shipping costs.

An object of the invention is to provide a biodegradable, insulative material from recycled material that can be shipped in a flat condition and that has competitive insulative qualities as Styrofoam containers.

An object of the invention is to provide an insulative layer that can be shipped flat and folded to define an air-tight, thermally-insulated compartment within the container. The container should be air-tight, be a stand-up container, and have a flap-over lid.

An object of the invention is to provide a container that includes at least one of the following objects (and preferably as many of the objects as is possible): 1) insulation, 2)

padding/cushioning, 3) absorption, 4) antimicrobial action, 5) biodegradability, and 6) cost efficiency.

In accordance with the objects of the invention, a container is provided that includes two layers: a box and an insulative layer. The box provides the general shape of the container when folded. The insulative layer gives the container improved insulative qualities.

The insulative layer is made from a purified flocked material. The purified flocked material is made from recycled textiles. The flocked material is thermally insulating. The flocked material is moldable into desired shapes. The shapes can be in the form of panels that complement the interior dimensions of the box. Several panels can be formed together. When several panels are joined together, the connection between the panels can be a mitered joint or include scoring to facilitate the folding of the insulative layer.

In preparing the insulative material, stiffening agents can be added to the flocked material. Absorptive powders especially those in the class of "super-absorbent powders" can be mixed into the flocked material. The absorptive powders wick, absorb, and contain any accidental spills.

Antimicrobials can be mixed into the flocked material. The antimicrobials mitigate possible contamination and cross-contamination.

Phase-change materials and packages of phase-change materials can be included within the container to cool contents within the container.

The insulative layer can be of any desired thickness to provide the desired insulation amounts. Typical thicknesses are 0.64 cm to 3.8 cm.

Customized logos, printing, and the like can be added to the insulative layer.

Other and further objects of the present invention will become apparent from the following detailed description of the invention when taken in conjunction with the appended drawings.

BEST MODES FOR CARRYING OUT THE INVENTION

Referring now to the drawings, the novel mailer is shown in FIGS. 1 to 4. The mailer is composed of materials that are 100% biodegradable. The outer surface of the novel mailer 10 includes a biodegradable film or paper 12 that is also waterproof Film 12 extends laterally so its lateral edges or margins 20 can be heat sealed together. At the bottom of the mailer, the film 12 is folded at fold 22. At the top of the mailer, the front top edge 28 terminates at the mailer opening 24, and the back continues upwardly to form flap 26 to enable the mailer 10 to be sealed by folding the flap 26 over the front of the mailer closing off the opening 24. The flap 26 has a lateral stripe of adhesive 30 covered with a removable protecting paper 32.

The inner surface of the mailer 10 is a biodegradable film or paper (substrate) 14 that is permeable. The inner surface of the mailer 10 includes a gusset 23. Sandwiched between the inner biodegradable film or paper (substrate) 14 and the outer film 12, and sealed on all sides, is a novel, proprietary, biodegradable pad 16 made from recycled, purified, ground material, to which super absorbent powders (for the absorption of spills), and antimicrobial powders (for the prevention of contamination in case of rupture for such products as blood or vaccines, etc.) have been added during manufacture. The antimicrobials are programmed to expire, after a preselected desired length of time, to allow for the eventual, natural, degradation/biodegradation of the mailer 10. The outer surface of the novel pad 16 is encompassed within the water-proof, biodegradable film or paper 12, sealed on two (or three) sides with film 14, which extends laterally coextensive with film 12. The film 14 is double-sealed, with pressure-sensitive, biodegradable tape 18 (covered with a protective strip 34, at the top, for safety and to prevent tampering). Film 14 does not surround the pad 16 completely but the end portions 40 extend around a periphery of the pad 16 sufficiently to enable the end portions 40 to be tucked under the bad and sealed with the film 12, at a joint 44.

Figure 1:
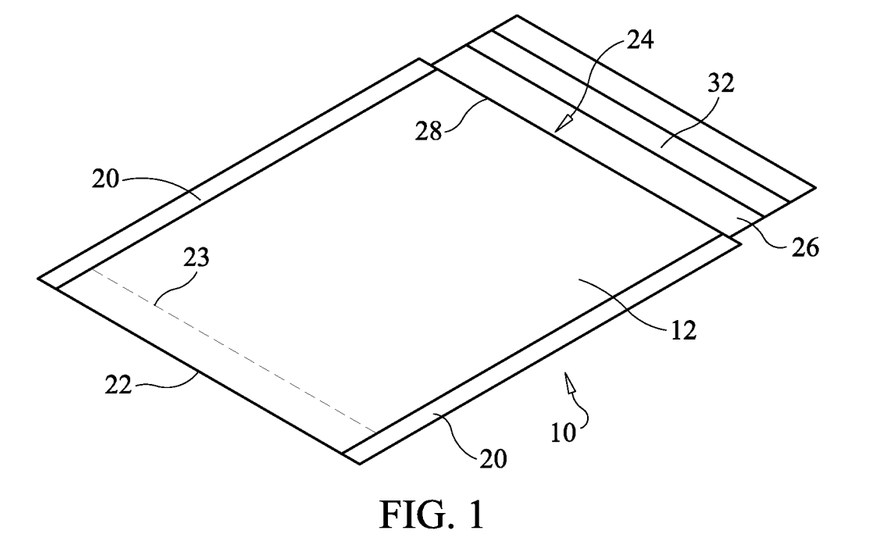
FIG. 1 is a diagrammatic front perspective view showing a mailer according to the invention lying flat.
Figure 2:
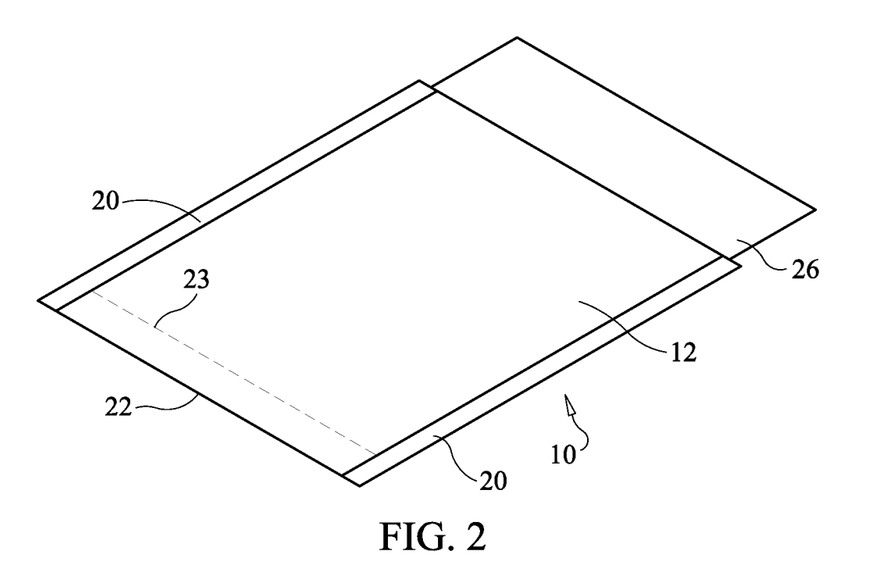
FIG. 2 is a diagrammatic rear perspective view showing the mailer of FIG. 1 lying flat.
Figure 3:
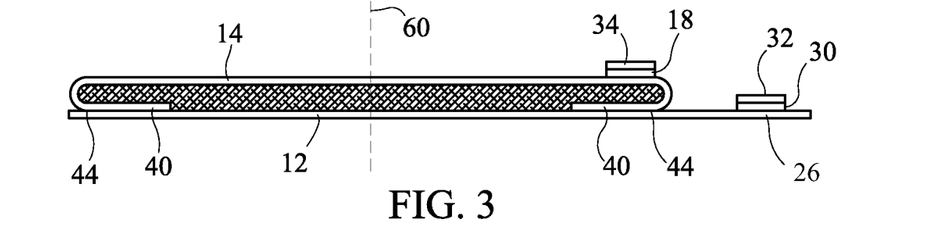
FIG. 3 is a longitudinal sectional view showing the mailer in a prior to folding and heat sealing.
Figure 4:
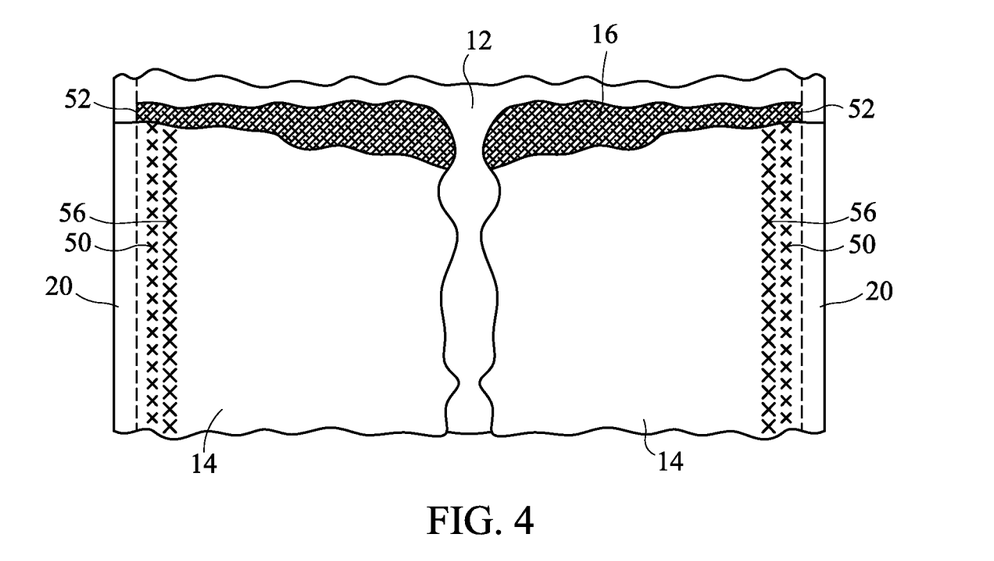
FIG. 4 is a partial view showing an upper part of the mailer shown in FIG. 3 (the left side as shown), prior to folding and heat sealing, partly broken away to reveal the component parts.

As shown in FIG. 4, the film 14 is stitched together with the pad 16 in the following manner. A row of smaller stitches 50 extend from top to bottom of the mailer 10 along each side thereof juxtaposed adjacent to the lateral edges 52 of pad 16. Spaced slightly inwardly of stitches 50 is a second row of larger stitches 56 that encompass the pad 16 and the film 14 on the inside of the pad 16 and include the portions 42 on the outside of the pad 16. The second rows of stitches only extend longitudinally from the top of the mailer 10 downwardly and terminate with the portions 42. Apart from the stitching 50 and 56 and heat sealing of the film 14 to film 12, pad 16 is not attached to film 12. The laid-out mailer shown in FIG. 3 is folded along the dotted line 60 to achieve the finished mailer in the manner noted above.

The pad 16, as duly noted, is made from re-cycled, purified, ground-up material, to which super absorbent powders (for the absorption of spills), and antimicrobial powders (for the prevention of contamination in case of rupture for such products as blood or vaccines, etc.) have been added during manufacture. The antimicrobials are programmed to expire, after a pre-selected desired length of time, to allow for the eventual, natural, degradation/biodegradability of the novel mailer.

As evident from the above description, the pad 16 is covered by the film 14 on the inside with film 14 extending laterally beyond the pad 16 to lie coextensive with the marginal edges of the film 12 so all marginal edges can be heat sealed together. Film 14 extends around the longitudinal extremities of the pad 16 so that the end portions 40 of the film 14 lie between the pad 16 and the outer film 12 when the pad 16 is located in the mailer 10. These portions 40 enable the film 14 to be heat sealed together with the film 12 around the mailer opening 24 thereby entrapping the pad 16. The portion of the opening 24 that lies with the flap 26 has the pressure-sensitive, biodegradable tape 18 (covered with a protective strip 34) in order to seal the top edges of the inner film 14 together before the flap 26 is sealed to the front of the mailer 10.

Phase-change materials (refrigerants/gel packs) used in the novel mailer are also biodegradable, making the entire shipping system cost effective, environmentally friendly, and socially responsible.

The novel pad serves six vital purposes: 1) insulation, 2) padding/cushioning, 3) absorption, 4) antimicrobial action, 5) biodegradability, and 6) cost efficiency (in terms of initial cost, as opposed to a foam-lined box, set-up/fulfillment labor expenses, storage space, with attendant charges, and in-bound and out-bound freight charges).

The insulation properties of the novel mailer are roughly equivalent to 3.81 cm of foam, thus, allowing for the savings of second-day shipping as opposed to the cost of overnight priority freight/delivery charges as is required with current mailer technology.

A specific example of a mailer according to the present invention is one that is 36.8 cm long, 25 cm wide and has a 11 cm flap. The top opening is about 22 cm across and can be opened to about 13 cm thereby facilitating loading.

Examples of the materials used for the novel mailer are as follows. Tri-extruded degradable sheeting can be used as a film. The film is manufactured as 94 cm lay flat at 0.010 cm.

White, opaque tri-extruded degradable sheeting can be used for film 14. The sheeting is manufactured with a degradable additive in all layers. The film manufactured is 30 cm lay flat at 0.0038 cm. For the film 12, a white opaque outside/silver-color inside triextruded degradable sheeting can be used. The sheeting is manufactured with a degradable additive in all layers. The film is manufactured as 30 cm lay flat at 0.010 cm. The films are obtainable commercially from a variety of suppliers.

An example of the sealing tape 18 is BP-1052 SIS block co-polymer rubber, obtainable from DarTape Technologies Corporation. Biodegradable materials are commercially available from ECM Biofilms, Inc., Painesville, Ohio. Incorporation of at least 1% of the ECM Masterbatch pellets will assure biodegradation. Antimicrobial materials useable are Lurol AM-7 obtainable from Goulston Technologies, Inc. of Monroe, N.C.

The pad 16 was made using new textile clippings mixed with commercially available antimicrobial and super-absorbent powders (such as carboxymethylcellulose) and then processed through a web forming operation to produce a pad or batten about 15 mm or 0.6 inches thick. Film 12 can be from about 2 mils thick to about 6 mils thick, and preferably about 4 mils thick. Film 14 can be from about 0.5 mils thick to about 5 mils thick, and preferably about 3 mils thick. Pad 16 can be from about 5 mm thick to about 25 mm thick and preferably about 15 mm thick.

FIGS. 5-14 show various embodiments of a biodegradable thermally-insulated container. The embodiments include an outside layer and an inside layer made of thermally-insulative flocked material.

The thermally-insulative flocked material is made from recycled textiles. The flocked material provides the thermally insulating properties to the container. The textiles is purified and then flocked. The textiles are recycled. A biodegradable stiffener is added to the flocked material. The stiffened material is then molded and cut into desired shapes.

The thermally-insulative material is shipped flat and then assembled with the container on site. The user of the container saves on inbound shipping of empty containers because the volume consumed by unassembled flat material is much less than the volume of assembled empty containers.

Figure 5:
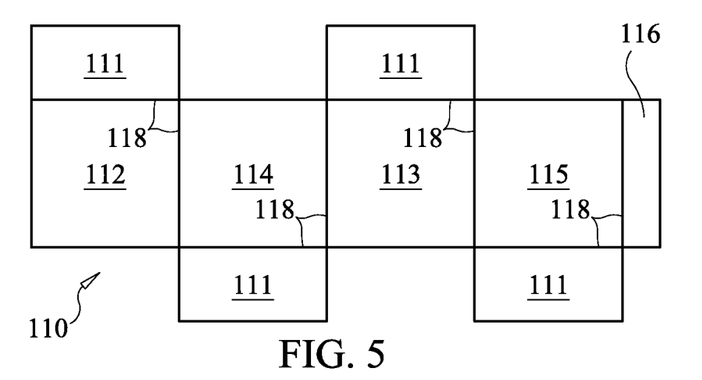
FIG. 5 is a diagrammatic top view of a box in a flat, unfolded position.

FIG. 5 shows a sheet that can be folded into a box 110. The sheet includes a row of four rectangular segments: front 112, right 114, back 113, and left 115. Flaps 111 which will form the top when folded extend from a top edge of the row of segments 112, 114, 113, and 115. Flaps 111 which will form the bottom when folded extend from a bottom edge of the row of segments 112, 114, 113, and 115. A tab 116 is included on one edge and is used during assembly of the box 110 from the sheet.

Figure 6:
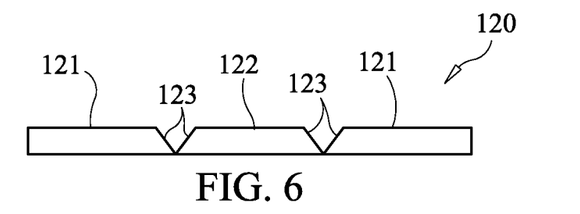
FIG. 6 is a diagrammatic side view of a three-segment insert according to the invention.
Figure 7:
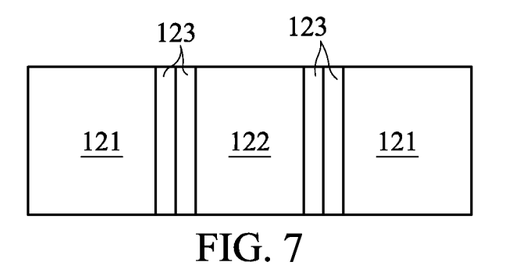
FIG. 7 is a top side view of the three-segment insert shown in FIG. 6.

FIGS. 6-7 shows an embodiment of a panel of stiffened flocked material in the form of a three-segment insert 120. The three-segment insert 120 is made from the stiffened flocked material described previously. The three-segment insert 120 includes three panels 121, 122, and 121 configured in a row. Each segment 121 or 122 is configured to overly a respective inner surface of the box 110. A miter joint 123 is formed between each segment 121, 122, and 121.

Figure 8:
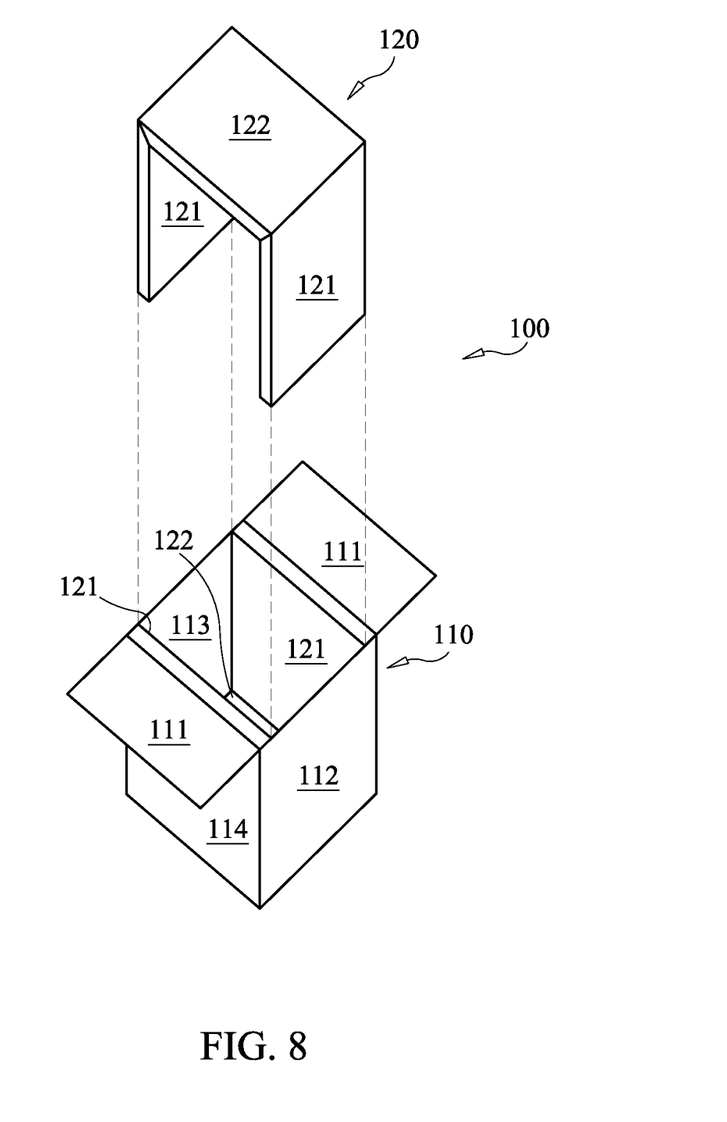
FIG. 8 is a perspective exploded view of a container with a box in the folded position with two three-segment inserts in a folded U-shape.
Figure 9:
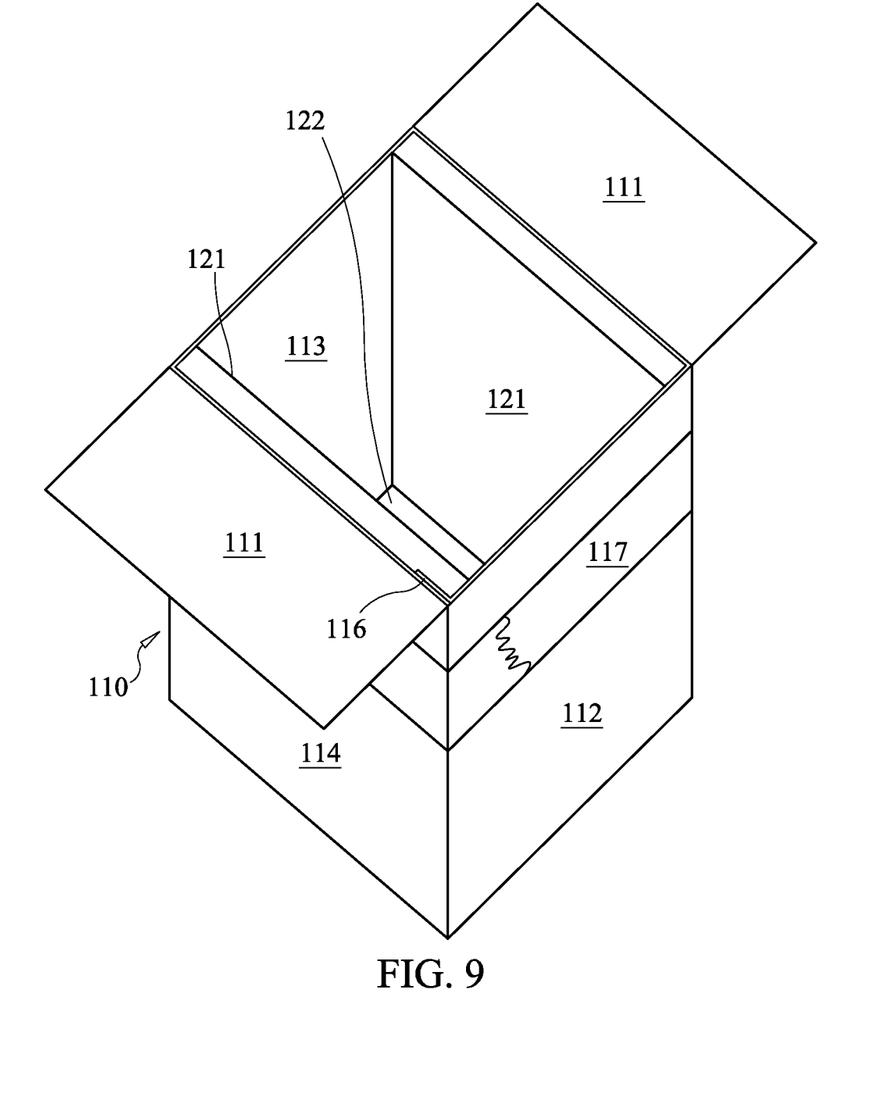
FIG. 9 is a perspective view of the container shown in FIG. 8 with a first of the two three-segment inserts inserted within the box.

As shown in FIGS. 8-9, two three segment inserts 120 can be used with a box 110 to form a container 100. First, the box 110 is assembled. Tape 117 can be added around the box 110 to secure the box 110 in its folded shape. Next, a three-segment insert 120 is folded from its unfolded flat form shown in FIGS. 6-7 into a folded U-shaped form shown in FIG. 8. As shown in FIG. 9, a first folded three-segment insert 120 is inserted into the box 110. The first leg 121 overlies the right of the box 110. The base 122 overlies the bottom of the box 110. The second leg 121 overlies the left of the box 110. The U-shape member is placed with the base 122 on the bottom of the box 110 to allow a second U-shaped member to be inserted. Next, as shown in FIG. 8, a second three-segment insert 120 is folded into a U-shape and inserted into the box 110. A first leg 121 of the second insert 120 overlies a back 113 of the box 110. A top 122 of the second insert 120 overlies a top (i.e. folded flaps 111) of the box 110. When the two U-shaped members 120 are inserted within the box 110, an insulated container is formed. The walls of the U-shaped members 120 are sized to contact each other to prevent air from being able to penetrate the insulated layer.

Figure 10:
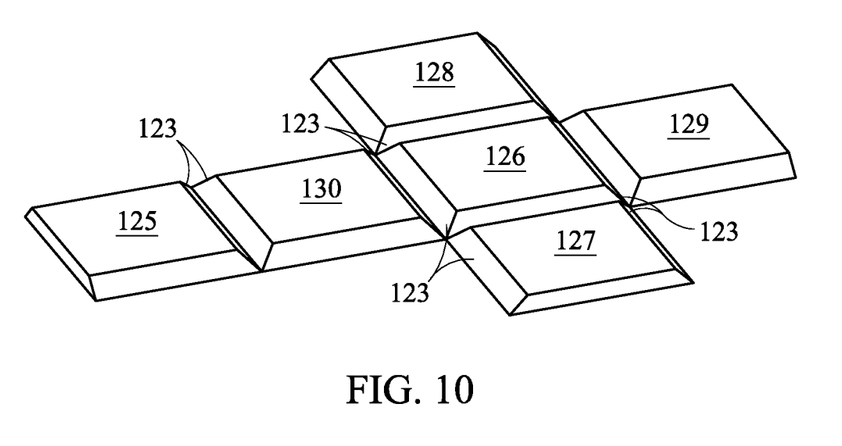
FIG. 10 is a perspective view of a cross-shaped six-panel insert with mitered joints.
Figure 11:
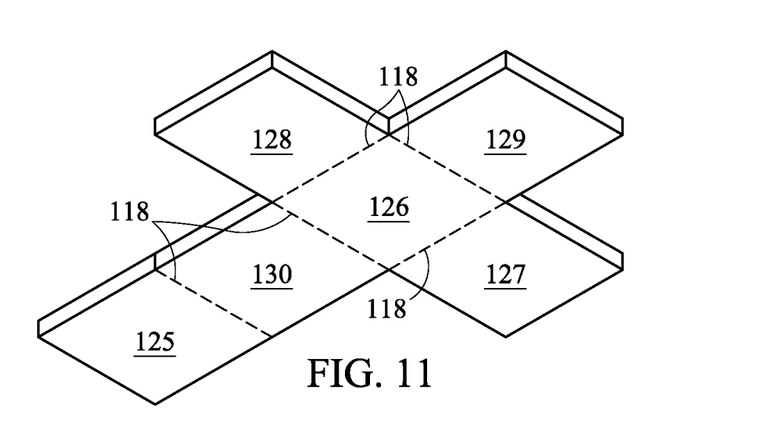
FIG. 11 is a perspective view of a cross-shaped six-panel insert with scored joints.

FIGS. 10-11 show two cross-shaped embodiments, which are referred to as six-panel inserts 124, of panels of stiffened flocked material. The panels take the form of four panels 125, 130, 126, 129 aligned in a column and a row of three panels 126, 127, and 128 (i.e. two laterally opposed panels 127 and 128 extending from the top and bottom edges of the second panel 126 in the column). In the embodiment shown in FIG. 10, the panels 125-130 have miter joints 123 between them. In the embodiment shown in FIG. 11, the panels 125-130 have scores 130 between them to assist in folding.

The embodiment shown in FIGS. 10-11 can be shipped flat (as shown in FIGS. 10-11) to the user. Then, the user can fold the six-panel inserts 124 into a box shape. The folded six-panel insert 124 is placed within a box 110. The size of the panels 125-130 are configured to overlap corresponding panels 111-115 of the box 110.

Figure 12:
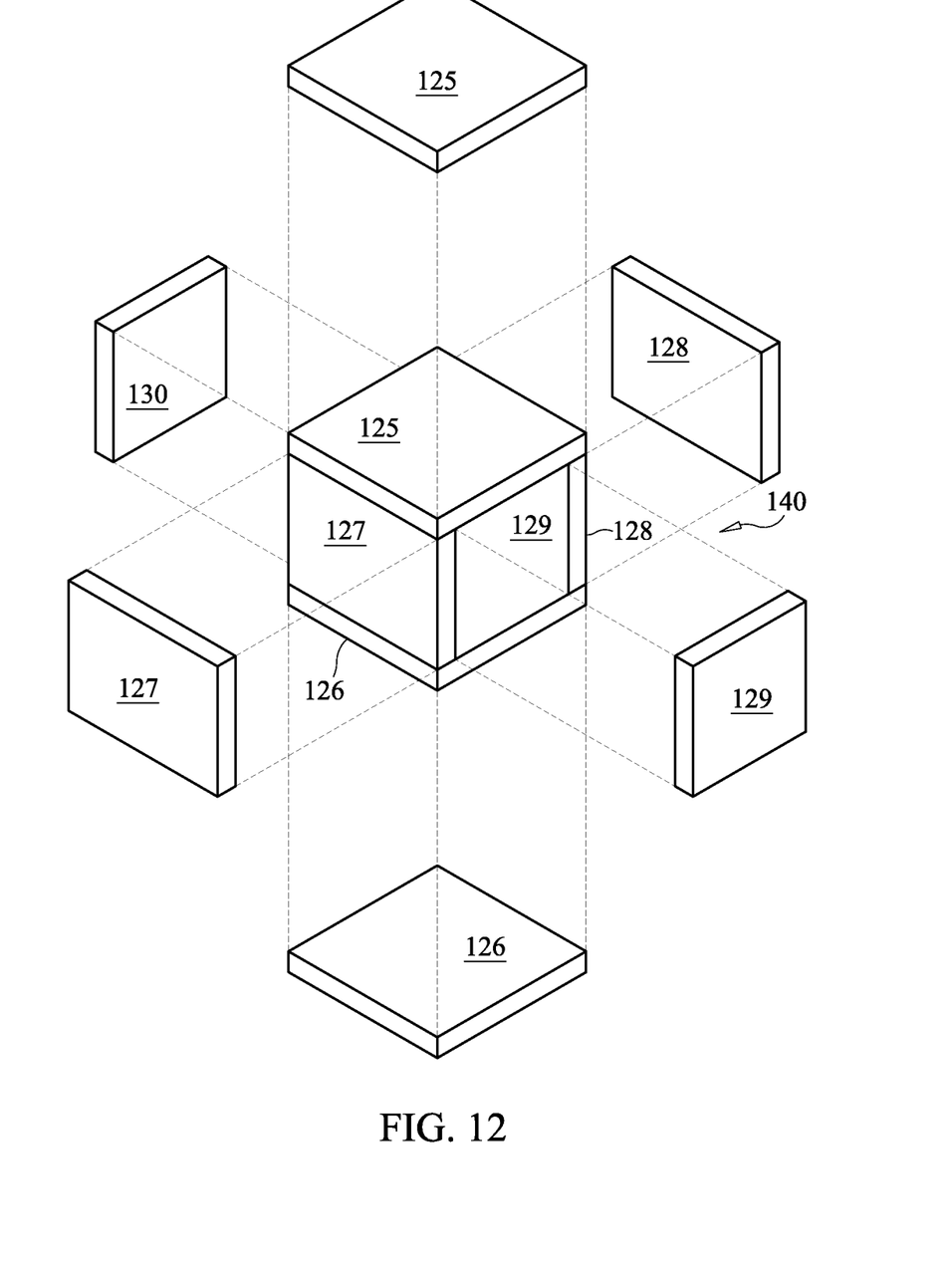
FIG. 12 is an exploded view of a six-panel insert with six separate panels.

FIG. 12 shows a six-panel insert 140. The six-panel insert is made from six separate panels 125-130. The panels 125-130 correspond to the faces 111-115 of a box 110. The panels 125-130 are inserted within the box and overly the interior of the faces 111-115. The panels 125-130 contact each other to form an insulated layer and compartment within the box 110.

Figure 13:
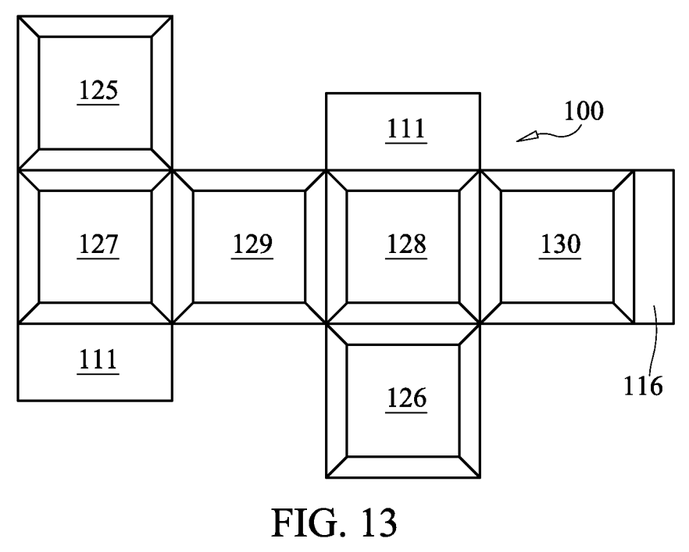
FIG. 13 is top side view of a container with panels adhered to the box, where the box is in an unfolded, flat position.
Figure 14:
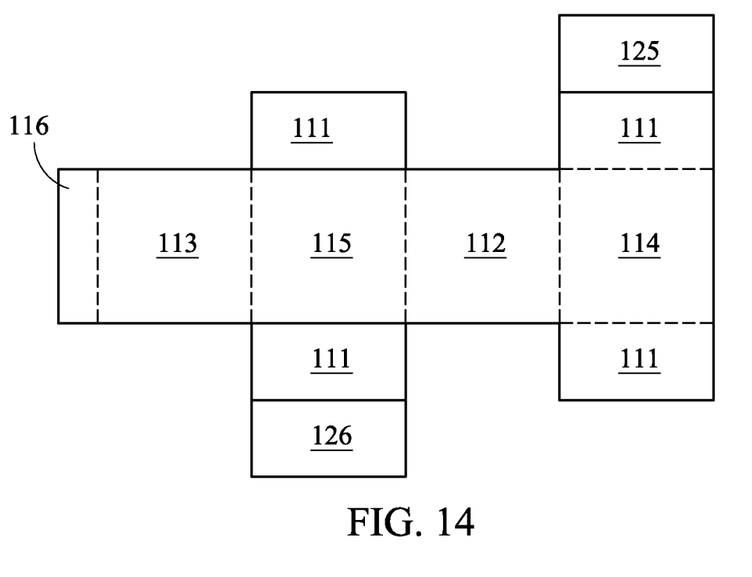
FIG. 14 is a rear side view of the container shown in FIG. 13.

FIGS. 13-14 show an embodiment of a container 100 that ships to the user flat. The box in the flat condition is like the box 110 shown in FIG. 5. Panels 125-130 are formed to complement the sides of the box 110. The panels 125-130 have mitered joints. Panels 125-130 are adhered to the faces 111-115 of the box 110. Glue is an example of a suitable adhesive to adhere the panels to the box. When the box 110 is folded, the panels 125-130 move with the box 110 into engagement with each other to form an insulated inner layer within the box 110. The inner layer is air-tight.

Although the invention has been described in terms of preferred embodiments, changes can be made which do not depart from the inventive concept. Such changes are deemed to fall within the purview of the appended claims.

INDUSTRIAL APPLICABILITY

The mailer and container according to the invention can be applied in the packaging and shipping industry.

What is claimed is:

1. A mailer comprising an outer, longitudinally extending, biodegradable film having lateral edges folded on itself to form a pocket having an opening and sealable by a flap, and an assembly composed of an inner, longitudinally extending, biodegradable film having lateral edges and a longitudinal extending pad composed of textile cuttings and antimicrobial and super-absorbent powders, with said inner film extending longitudinally around the pad and being attached to the pad, said assembly being positioned in said pocket with said inner film being sealed to the outer film adjacent the opening to the pocket, trapping the pad between the outer and inner films, a sealing tape mounted on the inner film adjacent to the pocket to seal the pocket closed, the lateral edges of both the outer and inner films extending laterally beyond the pad and being heat sealed together, wherein the mailer has two opposing side walls, which define the pocket, each side wall comprising the pad and the outer and inner films, wherein each side wall has a thermal resistance equivalent to the thermal resistance of a layer of expanded polystyrene foam having a thickness greater than the thickness of each side wall of the mailer.

2. A mailer according to claim 1 wherein the inner film is stitched to the pad adjacent to the heat sealed lateral edges of both the outer and inner films.

3. A mailer according to claim 1 wherein the pad is unattached to the outer film.

4. A mailer according to claim 1 wherein the pad is from about 5 mm thick to about 25 mm thick.

5. A mailer according to claim 4 wherein the pad is about 15 mm thick.

6. A mailer according to claim 1 wherein the outer film is from about 2 mils thick to about 6 mils thick.

7. A mailer according to claim 6 wherein the outer film is about 4 mils thick.

8. A mailer according to claim 1 wherein the inner film is from about 0.5 mils thick to about 5 mils thick.

9. A mailer according to claim 8 wherein the inner film is about 3 mils thick.

10. A mailer comprising:
an assembly comprising:
a longitudinally extending biodegradable pad having an inner surface, an outer surface, lateral edges, and longitudinal edges comprising textile cuttings; an inner, biodegradable, opaque, and insulative film including a degradable additive and having lateral edges, longitudinal edges, and end portions comprising a first sealing tape;
wherein
the inner film extends around and covers the inner surface and is attached to the pad,
the lateral edges of the inner film extend beyond the lateral edges of the pad,
the inner film extends around the longitudinal edges of the pad placing the end portions onto the outer surface,
and
the first sealing tape being positioned laterally on the inner surface covered by the inner film near one longitudinal edge;
an outer, biodegradable, opaque, and insulative film including a degradable additive and having marginal and longitudinal edges comprising a second sealing tape;
wherein
the longitudinal edges of the outer film extend beyond the longitudinal edges of the pad,
the assembly being positioned near one longitudinal edge of the outer film with an area of the outer film remaining uncovered and
the lateral edges of the inner film lie co-extensively with the marginal edges of the outer film,
the inner film being sealed to the outer film,
and
the second sealing tape being positioned laterally on the uncovered area near the longitudinal edge furthest from the assembly;
the assembly and outer film folding on themselves along a horizontal axis creating a pocket;
wherein the marginal edges and the lateral edges of the inner film are heat sealed together, and
wherein the mailer has two opposing side walls, which define the pocket, each side wall comprising the pad and the outer and inner films, wherein each side wall has a thermal resistance equivalent to the thermal resistance of a layer of expanded polystyrene foam having a thickness greater than the thickness of each side wall of the mailer.

11. A mailer according to claim 10 wherein the pad further comprises antimicrobial and super-absorbent powders.

12. A mailer according to claim 10 wherein the inner film is stitched to the pad adjacent to the heat sealed marginal edges of the outer film and the lateral edges of the inner film.

13. A mailer according to claim 10 wherein the pad is from about 5 mm thick to about 25 mm thick.

14. A mailer according to claim 10 wherein the outer film is from about 2 mils thick to about 6 mils thick and the inner film is from about 0.5 mils thick to about 5 mils thick.

15. A mailer comprising:
an assembly comprising:
a longitudinally extending biodegradable pad having an inner surface, an outer surface, lateral edges, and longitudinal edges comprising an insulative material;
an inner, biodegradable, opaque, and insulative film including a degradable additive and having lateral edges, longitudinal edges, and end portions comprising a first sealing tape;
wherein
the inner film extends around and covers the inner surface and is attached to the pad,
the lateral edges of the inner film extend beyond the lateral edges of the pad,
the inner film extends around the longitudinal edges of the pad placing the end portions onto the outer surface,
and
the first sealing tape being positioned laterally on the inner surface covered by the inner film near one longitudinal edge;
an outer, biodegradable, opaque, and insulative film including a degradable additive and having marginal and longitudinal edges comprising a second sealing tape;
wherein
the longitudinal edges of the outer film extend beyond the longitudinal edges of the pad,
the assembly being positioned near one longitudinal edge of the outer film with an area of the outer film remaining uncovered and the lateral edges of the inner film lie co-extensively with the marginal edges of the outer film,
the inner film being sealed to the outer film,
and
the second sealing tape being positioned laterally on the uncovered area near the longitudinal edge furthest from the assembly;
the assembly and outer film folding on themselves along a horizontal axis creating a pocket;
wherein the marginal edges and the lateral edges of the inner film are heat sealed together, and
wherein the mailer has units two opposing side walls, which define the pocket, each side wall comprising the pad and the outer and inner films, wherein each side wall has a thermal resistance equivalent to the thermal resistance of a layer of expanded polystyrene foam having a thickness greater than the thickness of each side wall of the mailer.

16. A mailer according to claim 15 wherein the insulative material comprises textile cuttings.

17. A mailer according to claim 15 wherein the pad further comprises antimicrobial and super-absorbent powders.

18. A mailer according to claim 15 wherein the inner film is stitched to the pad adjacent to the heat sealed marginal edges of the outer film and the lateral edges of the inner film.

19. A mailer according to claim 15 wherein the pad is from about 5 mm thick to about 25 mm thick.

20. A mailer according to claim 15 wherein the outer film is from about 2 mils thick to about 6 mils thick and the inner film is from about 0.5 mils thick to about 5 mils thick.

21. A mailer comprising an outer, longitudinally extending, biodegradable film having lateral edges folded on itself to form a pocket having an opening and sealable by a flap, and an assembly comprising an inner, longitudinally extending, biodegradable film having lateral edges and a longitudinal extending pad comprising textile cuttings and antimicrobial and super-absorbent powders, with said inner film extending longitudinally around the pad and being attached to the pad, said assembly being positioned in said pocket with said inner film being sealed to the outer film adjacent the opening to the pocket, trapping the pad within the pocket, a sealing tape mounted on an inner surface of the outer film adjacent the pocket to seal the pocket closed, the lateral edges of both the outer and inner films extending laterally beyond the pad and being heat sealed together, wherein the mailer has two opposing side walls, which define the pocket, each side wall comprising the pad and the outer and inner films, wherein each side wall has a thermal resistance equivalent to the thermal resistance of a layer of expanded polystyrene foam having a thickness greater than the thickness of each side wall of the mailer.

* * * * *